US012016386B2

(12) United States Patent
Pijnenburg

(10) Patent No.: US 12,016,386 B2
(45) Date of Patent: Jun. 25, 2024

(54) HEATER SHELL OF HEATER ASSEMBLY FOR AN AEROSOL-GENERATING DEVICE

(71) Applicant: PHILIP MORRIS PRODUCTS S.A., Neuchatel (CH)

(72) Inventor: Johannes Petrus Maria Pijnenburg, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 555 days.

(21) Appl. No.: 17/281,366

(22) PCT Filed: Oct. 8, 2019

(86) PCT No.: PCT/EP2019/077223
§ 371 (c)(1),
(2) Date: Mar. 30, 2021

(87) PCT Pub. No.: WO2020/074515
PCT Pub. Date: Apr. 16, 2020

(65) Prior Publication Data

US 2022/0022541 A1 Jan. 27, 2022

(30) Foreign Application Priority Data

Oct. 8, 2018 (EP) .................................... 18199199

(51) Int. Cl.
*A24F 47/00* (2020.01)
*A24F 1/30* (2006.01)
(Continued)

(52) U.S. Cl.
CPC ................ *A24F 40/46* (2020.01); *A24F 1/30* (2013.01); *A24F 40/20* (2020.01); *A24F 40/70* (2020.01); *H05B 3/0014* (2013.01); *H05B 6/105* (2013.01)

(58) Field of Classification Search
CPC .. A24F 40/46; A24F 1/30; A24F 40/20; A24F 40/70; A24F 47/00; H05B 3/0014; H05B 6/105; H05B 1/0227; H05B 1/0291
See application file for complete search history.

(56) References Cited

U.S. PATENT DOCUMENTS 4,322,592 A * 3/1982 Martin .................. H05B 6/105 219/649
9,451,792 B1 9/2016 Alima
(Continued)

FOREIGN PATENT DOCUMENTS

EA 000244 9/1999
EP 3183979 6/2017
(Continued)

OTHER PUBLICATIONS

Search Report and Written Opinion for PCT/EP2019/077223 dated Dec. 9, 2019 (16 pages).
(Continued)

*Primary Examiner* — Abdullah A Riyami
*Assistant Examiner* — Nelson R. Burgos-Guntin
(74) *Attorney, Agent, or Firm* — Mueting Raasch Group

(57) ABSTRACT

The present invention relates to a heater assembly for an aerosol-generating device. The device comprises a heater shell, a support element and at least one heating element. The heater shell is configured to receive the heating element. The heater shell has an inner wall. The inner wall comprises a plurality of thermally insulating cavities. The heating element is arranged lining the inner wall of the heater shell. The heater shell is arranged within the support element.

14 Claims, 4 Drawing Sheets

(51) Int. Cl.

| | |
|---|---|
| ***A24F 40/20*** | (2020.01) |
| ***A24F 40/46*** | (2020.01) |
| ***A24F 40/70*** | (2020.01) |
| *H05B 3/00* | (2006.01) |
| *H05B 6/10* | (2006.01) |

(56) References Cited

U.S. PATENT DOCUMENTS

| | | | | |
|---|---|---|---|---|
| 10,609,958 | B2 | 4/2020 | Robinson | |
| 2010/0313901 | A1* | 12/2010 | Fernando | B65D 85/1081 131/330 |
| 2011/0006055 | A1* | 1/2011 | Diehl | H05B 6/105 219/600 |
| 2014/0305454 | A1* | 10/2014 | Rinker | A24F 40/46 131/329 |
| 2014/0338686 | A1* | 11/2014 | Plojoux | A24F 40/485 131/329 |
| 2014/0366900 | A1* | 12/2014 | Plojoux | A24F 40/40 131/329 |
| 2015/0157055 | A1* | 6/2015 | Lord | A24F 40/00 131/329 |
| 2016/0198768 | A1* | 7/2016 | Liu | A24F 40/46 392/404 |
| 2016/0302488 | A1* | 10/2016 | Fernando | G01N 21/31 |
| 2017/0035116 | A1* | 2/2017 | Batista | B65D 47/36 |
| 2017/0042221 | A1* | 2/2017 | England | A24D 3/063 |
| 2017/0042243 | A1 | 2/2017 | Plojoux | |
| 2017/0049154 | A1* | 2/2017 | Batista | H05B 1/0244 |
| 2017/0094998 | A1* | 4/2017 | Bernauer | A24F 40/70 |
| 2017/0108210 | A1* | 4/2017 | Meinhart | B05B 7/1686 |
| 2017/0143041 | A1* | 5/2017 | Batista | A24F 1/00 |
| 2017/0143042 | A1* | 5/2017 | Batista | A24F 40/42 |
| 2017/0238596 | A1* | 8/2017 | Matsumoto | A24F 40/46 |
| 2017/0238605 | A1* | 8/2017 | Matsumoto | A24F 40/485 |
| 2017/0340003 | A1* | 11/2017 | Batista | A24F 40/46 |
| 2017/0340014 | A1* | 11/2017 | Batista | A24F 40/485 |
| 2017/0354184 | A1* | 12/2017 | Mironov | A24F 40/48 |
| 2017/0360088 | A1* | 12/2017 | Pijnenburg | A24F 40/53 |
| 2017/0360096 | A1* | 12/2017 | Silvestrini | F28B 9/08 |
| 2017/0367409 | A1* | 12/2017 | Thorens | A61M 15/06 |
| 2018/0000160 | A1 | 1/2018 | Taschner | |

FOREIGN PATENT DOCUMENTS

| | | |
|---|---|---|
| EP | 3216359 | 9/2017 |
| EP | 3248483 | 11/2017 |
| JP | 2017-515485 | 6/2017 |
| KR | 10-2012-0101637 | 9/2012 |
| KR | 10-2014-0116055 | 10/2014 |
| RU | 2664228 | 8/2018 |
| WO | WO 2013/034458 | 3/2013 |
| WO | WO 2013/098395 | 7/2013 |
| WO | WO 2014/020953 | 2/2014 |
| WO | WO 2015/107552 | 7/2015 |

OTHER PUBLICATIONS

Office Action issued in Russia for Application No. 2021109316 dated Sep. 20, 2021 (5 pages). English translation included.

Office Action issued in Japan for Application No. 2021-518742 dated May 30, 2022 (5 pages). English translation included.

Office Action issued in Korea for Application No. 10-2021-7007393 dated Oct. 27, 2022 (9 pages). English translation included.

* cited by examiner

HEATER SHELL OF HEATER ASSEMBLY FOR AN AEROSOL-GENERATING DEVICE

This application is a U.S. National Stage Application of International Application No. PCT/EP2019/077223 filed Oct. 8, 2019, which was published in English on Apr. 16, 2020 as International Publication No. WO 2020/074515 A1. International Application No. PCT/EP2019/077223 claims priority to European Application No. 18199199.3 filed Oct. 8, 2018.

The present invention relates to a heater assembly of an aerosol-generating device and to a method for manufacturing a heater assembly for heating an aerosol-forming substrate in an aerosol-generating device. The heater assembly comprises a heater shell, a support element and at least one heating element.

Aerosol-generating devices are known which heat but which do not burn aerosol-forming substrates such as tobacco. Such devices heat aerosol-forming substrates to a sufficiently high temperature for generating an aerosol for inhalation by the user.

Such aerosol-generating devices typically comprise a heating chamber, wherein a heating element is arranged within the heating chamber. An aerosol-generating article comprising an aerosol-forming substrate may be inserted into the heating chamber and heated by the heating element. Such aerosol-generating devices are typically portable devices. Such devices are typically powered by a source with a finite energy capacity, such as a battery. In order to minimize energy consumption and hence increase operating time of the aerosol-generating device, the heat loss from the heating chamber by e.g. radiation, conduction or convection should be minimized and heat transfer from the heating element to the aerosol-forming substrate maximized.

For mitigating at least some of these and optionally further problems, the present invention relates to a heater assembly for an aerosol-generating device. The device comprises a heater shell, a support element and at least one heating element. The heater shell is configured to receive the heating element. In this way, the heater shell may function as a housing for the heating element. The heater shell has an inner wall. The inner wall comprises a plurality of thermally insulating cavities. The heating element is arranged lining the inner wall of the heater shell. The heater shell is arranged within the support element. The plurality of cavities is thermally insulating, or contributes to a thermally insulating effect.

The heater shell may be a casing for receiving a heating element. The inner wall of heater shell is preferably a wall fully or partially enclosing a space within the heater shell. The space within the heater shell may be a cavity. The heater shell may have a base. The base may be part of the inner wall of the heater shell. The heater shell preferably has an opening, into which a heating element may be inserted. The heater shell may have an opening, into which an aerosol-generating article comprising aerosol-forming substrate may be inserted. The heater shell may not have an opening and instead the heater shell may comprise a through hole into which the heating element may be inserted.

The plurality of thermally insulating cavities may be arranged on the inner wall of the heater. Each of the thermally insulating cavities may be defined by at least one wall. The wall or walls defining the cavities may be interconnected. Thus, the cavities may be interconnected. Each cavity may be fully or partially enclosed by at least one wall. The cavities may be substantially filled with air.

The cavities may form a plurality of apertures on the inner wall of the heater shell. The cavities may each have a base. The cavities may each have an opening. The openings of the cavities may face the inside of the heater shell. The openings of the cavities may face the outside of the heater shell. The cavities may also be denoted as recesses, voids, hollows, craters, nooks, fissures or detents. The cavities may be completely surrounded by walls. That is, each cavity may have completely enclosed sidewalls with respect to adjacent cavities, to define an individual cavity cell. The heater shell may be made from a material with a relatively high thermal resistance. For example, the heater shell may be made from a material which does not suffer thermal degradation below at least 200° C., preferably below 300° C., preferably below 400° C. The heater shell may be made from a material which is substantially inert. The heater shell may be made from a material which is resistant to degradation by vapours formed when an aerosol-generating article comprising an aerosol-forming substrate is heated to a vaporisation temperature within the heater shell. The heater shell may be made of a polymeric material.

In general, heat transfer mainly proceeds via convective, conductive or radiative heat transfer. Conduction of heat may occur spontaneously between two solid objects in direct contact with each other from the object having a higher temperature (heat source) to the object having a lower temperature (heat sink). The efficiency of conductive heat transfer may depend on material properties of the objects in contact, such as thermal conductivity. Convection may be the heat transfer through fluids, such as gases or liquids. Hereby, particles constituting the fluid may carry energy with them when they move through the fluid. Convective heat transfer may be forced, when a flow of particles is induced by an external agent, or may be spontaneous along temperature gradients within the fluid from a region of higher temperature to a region of lower temperature. Radiative heat transfer may proceed through the propagation of electromagnetic waves which may be emitted by e.g. solids or liquids. Thermal radiation may substantially be infrared radiation.

The heater shell may be heat reflective. The heater shell may have a coating of a heat reflective material. The heater shell may have a coating of a heat reflective material on the inner wall of the heater shell. The heat reflective coating may be configured to at least partly reflect infrared radiation. Such a coating may be made from a thin film of metal. The metal may be silver or gold or any other metal possessing high reflectance with respect to thermal radiation. The heater shell and hence the inner wall of the heater shell may be made from a heat reflective material. The heat reflective material of the heater shell may be configured to at least partly reflect infrared radiation. Provision of a heat reflective heater shell may reduce heat loss from the heater shell into its external environment. Provision of a heat reflective heater shell may increase efficiency in an aerosol-generating device by reflecting infrared radiation back towards a heating chamber or region in which an aerosol-generating article comprising an aerosol-forming substrate is disposed.

The heater shell may be thermally insulating. Implementation of the thermally insulating heater shell into an aerosol-generating device may minimize heat loss from the aerosol-generating device. The cavities may thermally insulate the heater shell. Thermal insulation may be achieved by the reduction of convective heat loss from the heater shell. Convective heat loss may be reduced by the presence of the cavities on the inner surface of the heater shell. Airflow between a heating element inserted into the heater shell and the inner wall of the heater shell is reduced or prevented. In this way, convection currents may be prevented or reduced by the impeding presence of the cavities. The thermal insulation may also be a result of reduced conduction. This may be a result of the contact area between a heating element which may be inserted in to the heater shell, and the heater shell being reduced by the presence of the cavities. The presence of the cavities may reduce conductive heat loss as their presence lowers the overall thermal conductivity of the heater shell. Radiative heat loss may be minimised by the cavities as diffuse reflections of thermal radiation may occur in the cavities, such that a portion of the thermal radiation is reflected back towards a heating element and an aerosol-generating article inserted into the heater shell. Radiative heat loss may also be minimised by providing a heater shell with a heat reflective inner wall of the heater shell. Hereby thermal radiation may be reflected from the heat reflective inner wall of the heater shell back towards a heating element and an aerosol-generating article which may be received by the heater shell.

Heat generated by the heating element may be transferred to the periphery of the aerosol-generating devices by convective, conductive and radiative heat transfer. Convective heat transfer may proceed through points of physical contact between the heating element and other components of the aerosol-generating device. The presence of the thermally insulating cavities may reduce the contact area between the heating element and the aerosol-generating device and hence may decrease the conductive thermal energy transfer to the periphery of the aerosol-generating device. Furthermore, heat may be transferred convectively by (air) currents formed along the temperature gradient generated by the heating element or by the draw of a consumer of the aerosol-generating article. The cavities capture pockets of (heated) air, such that such current is at least partially obstructed and hence thermal energy transfer by convection is reduced.

The heater shell may be designed to be easily incorporated and removed from an aerosol-generating device. Accordingly, it may be easy to replace the heater shell in an aerosol-generating device for a fraction of the cost it would require to replace the aerosol-generating device as a whole. Hence, usage of a heater shell may be environmentally friendly. Furthermore, due to the low cost of replacing the heater shell, rather than the aerosol-generating device as a whole, the consumer may financially benefit from using an aerosol-generating device using the heater shell. Furthermore, the consumption experience may be improved for the consumer. For example, undesirable condensation of aerosol and formation of deposits within the aerosol-generating device which may affect the flavour of the aerosol released from an aerosol-forming substrate. Such condensation may occur within the replaceable heater shell, rather than a non-replaceable part of an aerosol-generating device into which the heater shell has been incorporated to. Accordingly, by changing the heater shell at regular time intervals and hence removing undesired deposits formed during operation, the consumption experience for the consumer may be improved. Furthermore, condensed aerosol may collect inside the cavities of the heater shell. The condensed aerosol may be trapped inside the cavities of the heater shell. In this way, leakage of condensed aerosol may be prevented.

The cavities of the heater shell may be defined by at least one protrusion on the inner wall of the heater shell.

The protrusion may be a plurality of interconnected walls defining the cavities on the surface of the inner wall of the heater shell. Thereby, the cavities may be completely or partially surrounded by interconnected walls. The cavities may form a plurality of apertures on the inner wall of the heater shell. The cavities may have a base surface. The base surface may be flat or curved. The shape of cavities defined by the protrusion may be regular or irregular. The protrusion may be made from a polymeric material. The protrusion may be made from a material having low thermal conductivity. In this way conductive heat loss through the protrusions is minimised.

The cavities may form a repeating pattern on the inner wall of the heater shell. The cavities may be arranged in regular or irregular patterns. The spatial dimensions of the cavities forming the pattern may be uniform or may vary from cavity to cavity. Preferably, the pattern formed by the cavities covers the entire inner wall of the heater shell. In this way the number of cavities may be maximised. Accordingly, the contact area between the heater shell and a heating element which may be inserted into the heater shell may be minimised. Hence, conductive heat loss from the heater shell towards is surrounding may be minimised. The presence of a high number of cavities may minimise air flow at the inner wall of the heater shell. In this way, convective heat loss is reduced.

Each cavity may have a hexagonal shape, preferably such that the plurality of cavities forms a honeycomb pattern. Each cavity may have a rectangular shape, preferably such that the plurality of cavities forms a grid pattern. Honeycomb pattern preferably refers to a regular arrangement of hexagonally shaped cavities. Structures possessing a honeycomb pattern provide high stability at minimum weight. Accordingly, they are highly suitable for use in the heater shell of the present invention as the weight of the aerosol-generating device into which the heater shell may be incorporated may be minimized without substantial loss of stability of the heater shell. The term grid pattern preferably describes a pattern comprising rectangular shaped cavities. Preferably, when arranged in a grid pattern, the rectangular shaped cavities have the equal spatial dimensions. More preferably, the rectangular shaped cavities are square shaped. The vertices of the rectangles forming the grid pattern may be rounded.

Preferably, the cavities are arranged in a regular pattern, such as in a tessellating pattern. Regular patterns of cavities such as a tessellating pattern, a honeycomb pattern or a grid pattern are preferred as such regular patterns may be easier to manufacture. Furthermore, maintenance of high quality standards is more attainable when such regular patterns are used. By providing tessellating or a honeycomb or grid pattern of cavities, a high number of cavities may be arranged on the inner wall of the heater shell. In this way, the number of thermally insulating cavities may be maximised. Accordingly, air circulation may be minimised and convective heat loss may be minimised by providing a tessellating or honeycomb or grid pattern of cavities on the inner wall of the heater shell.

The heater shell may have a tubular, cylindrical, conical or frustoconical shape. The term tubular may include any hollow conduit shape. The term tubular may include a prism with an opening, such as a hollow prism. The cross sectional shape of the hollow prism may be any of a variety of geometrical shapes, such as a circle, an ellipse, oval, a squoval, a squircle, a stadium, a triangle, a square, pentagon, hexagon, etc. The prism may have a varying cross sectional dimension. For example, in some embodiments, the prism may have a tapering cross sectional dimension. For example, where the cross section is a circle, in some embodiments, the radius of the circle may gradually reduce from one end to another end of the length of the prism. In this way, the heater shell may have a conical or frustoconical shape. Cylindrical, conical and frustoconical shaped heater shells are most preferred. The shape and size, and in particular the preferred tubular, cylindrical, conical or frustoconical shapes of the heater shell may reflect the shapes and size of commonly used aerosol-generating articles. By matching the shapes of the heater shell and the aerosol-generating article, more efficient surface contact between the aerosol-generating article and a heating element positioned inside the heater shell may be achieved. In this way, efficient heat transfer from the heating element to the aerosol-generating article and the aerosol-forming substrate may be accomplished. In particular, conically and frustoconical shaped heater shells may guide the insertion of an aerosol-generating article into the heater shell. This also means that the aerosol-generating device into which the heater shell may be incorporated may tolerate small deviations in spatial dimensions of a particular type of aerosol-generating article that may be inherent in the manufacturing of the aerosol-generating article. A heating chamber into which the heater shell may be inserted may complement the shape and size of the heater shell. The heater shell may at least partially define the shape and size of a heating chamber into which the heater shell may be incorporated.

The heater shell may comprise at least one projection on the outer wall of the heater shell. The at least one projection has preferably a ring shape. Several projections may be provided on the outer wall of the heater shell.

The outer wall of the heater shell may preferably be the wall of the heater shell defining the outer contour of the heater shell. The outer wall of the heater shell may be in contact with other elements, such as, for example, a support element or the inner wall of a heating chamber into which it may be inserted. A support element will be described in more detail below. The projection on the outer wall of the heater shell may reinforce the structure of the heater shell and hence may increase the stability of the heater shell. The projection on the outer wall of heater shell may be configured to minimise the contact area between the heater shell and its external environment, such as the inner wall of a heating chamber or the inner wall of a support element. In this way, the conductive thermal energy loss from the heater shell to its external environment is minimised.

The heater shell may comprise at least one securing tooth.

Preferably, the at least one securing tooth is provided on the outer surface of the heater shell. A securing tooth may be a protuberance. Such protuberance may extend from the outer wall of the heater shell. The securing tooth may be provided to immobilize the heater shell relative to another object by an interaction of the securing tooth with the other object. Preferably, the securing tooth is rectangular shaped. In one embodiment, at least one securing tooth is provided on the rim of a tubular, cylindrical, conical or frustoconical shaped heater shell. Preferably, the at least one securing tooth is easily bendable. In particular, the securing tooth may be designed to bend towards the outer wall of the heater shell when inserted into a heating chamber or into a support element by frictional forces between the surface of the securing tooth and the surface of the inner wall of the heating chamber or the inner wall of the support element. The position of the heater shell relative to the heating chamber or the support element may be fixed and secured by the securing tooth. Preferably, the securing tooth may be made from a polymeric material. Preferably, the heater shell may comprise more than two securing teeth. Most preferably, the heater shell may comprise three securing teeth. If more than one securing tooth is provided, the securing teeth may preferably be configured in a symmetric arrangement. Preferably, the arrangement is such that for n securing teeth, securing teeth are positioned at each vertex of an imaginary n-polygon. For example, if three securing teeth are present on the heater shell, the securing teeth may be positioned at each vertex of an imaginary triangle.

The present invention also relates to a support element for a heater assembly of an aerosol-generating device. The support element may be configured for receiving a heater shell. The support element may have an inner wall. The support element may have an outer wall. The inner wall of the support element is preferably a wall fully or partially enclosing a space within the support element. The space within the support element may be a cavity. The support element may have a base. The base may be part of the inner wall of the support element. The support element preferably has an opening, into which the heater shell may be inserted. The support element may not have an opening and instead the support element may comprise a through hole into which the heater shell may be inserted. The support element may be made from a material with a relatively high thermal resistance. For example, the support element may be made from a material which does not suffer thermal degradation below at least 200° C., preferably below 300° C., preferably below 400° C. The support element may be made from a material which is substantially inert. The support element may be made from a material which is resistant to degradation by vapours formed when an aerosol-generating article comprising an aerosol-forming substrate is heated to a vaporisation temperature within the heater shell and the heater shell is inserted into the support element. The support element may be made from a polymeric material.

A heat reflective coating may be provided on the inner wall of the support element. The support element may have a coating of a heat reflective material on the inner wall of the support element. The heat reflective coating may be configured to at least partly reflect infrared radiation. Such a coating may be made from a thin film of metal. The metal may be silver or gold or any other metal possessing high reflectance with respect to thermal radiation. Provision of the heat reflective coating on the inner wall of the support element may reduce radiative heat loss from the support element to its external surroundings as thermal radiation incident on the heat reflected coating is reflected back into the support element. The support element may be made of a heat reflective material. Such a heat reflective material of the heater shell may be configured to at least partly reflect infrared radiation. Provision of a heat reflective heater shell may reduce heat loss from the heater shell into its external environment. Provision of a heat reflective support element may increase efficiency in an aerosol-generating device by reflecting infrared radiation back towards a heating chamber or region in which an aerosol-generating article comprising an aerosol-forming substrate is disposed.

The support element may comprise at least one projection on the inner wall of the support element such that at least one thermally insulating cell is formed between the support element and a heater shell when the heater shell is inserted into the support element. Several projections may be provided on the inner wall of the support element. The at least one projection on the inner wall of the support element preferably has a linear shape. Preferably, the at least one projection on the inner wall of the support element may be complementary to the at least one projection on the outer wall of the heater shell. In this way, at least one thermally insulating cell between the support element and heater shell may be formed. The cell may be filled with air. The projection on the inner wall of the support element may be configured to minimize the contact area between the support element and the heater shell which may be inserted into the support element. Hence, the contact area and accordingly conductive heat transfer between the support element and the heater shell may be reduced. Furthermore, convective heat loss from the heater shell may be reduced, as air flow between a heater shell inserted into the support element and the support element may be minimized. The cell may be defined by the projections on the outer wall of the heater shell and the projections on the inner wall of the support element. In a preferred embodiment, projections on the outer wall of a tubular heater shell may be ring shaped, wherein the imaginary plane through any of the ring shaped protrusions may be perpendicular to the longitudinal axis of the tubular heater shell. At the same time, the projections on the inner wall of the tubular support element may be linear segments, wherein the longitudinal axes of each linear segment may be parallel to the inner wall of the tubular support element. By provision of the projections on the inner wall of the support element and the inner wall of the heater shell, a self-centering assembly may be obtained when the heater shell may be inserted into the support element.

The support element may comprise at least one projection on the outer wall of the support element. Several projections may be provided on the outer wall of the support element. The at least one projection preferably has a linear shape. The outer wall of the support element may preferably be the wall of the support element defining the outer contour of the support element. The outer wall of the support element may be in contact with other elements, such as, for example, the inner wall of a heating chamber into which the support element may be inserted. The support element may define the shape and size of the heating chamber. The heating chamber may define the shape and size of the support element. The projection on the outer wall of the support element may reinforce the structure of the support element and hence increase the stability of the support element. Due to the presence of the projection on the outer wall of the support element, a gap may be formed between the support element and its external surroundings. The gap may be substantially filled with air. The layer of air in the gap may act as an insulating layer reducing convective heat loss from the support element to its external environment. Furthermore, the projection on the outer wall of support element may be configured to minimise the contact area between the support element and its external surroundings, such as the inner wall of the heating chamber. In this way, conductive thermal energy loss from the support element to its external environment by heat conduction through the contact points is minimised.

The support element may have a tubular, cylindrical, conical or frustoconical shape. The term tubular may include any hollow conduit shape. The term tubular may include a prism with an opening, such as a hollow prism. The cross sectional shape of the hollow prism may be any of a variety of geometrical shapes, such as a circle, an ellipse, oval, a squoval, a squircle, a stadium, a triangle, a square, pentagon, hexagon, etc. The prism may have a varying cross sectional dimension. For example, in some embodiments, the prism may have a tapering cross sectional dimension. For example, where the cross section is a circle, in some embodiments, the radius of the circle may gradually reduce from one end to another end of the length of the prism. In this way, the support element may have a conical or frustoconical shape. Cylindrical, conical and frustoconical shaped support elements are most preferred. The shape and size of the support element may at least partially define or reflect or complement the shape and size of its external surroundings. The shape and size of the support element may complement the shape and size of the heater shell. The shape and size of a heater shell inserted into the support element may complement the shape and size of the support element. The shape and size of a heating element inserted into the heater shell may at least partially define the shape and size of the heater shell. The shape and size an aerosol-generating article inserted into the heating element may reflect the shape and size the heating element.

The support element may have at least one securing tooth. A securing tooth may be a protuberance. Such protuberance may extend from the outer wall of the support element. The securing tooth may be provided to immobilize the support element relative to another object by an interaction of the securing tooth with the other object. Such other object may be the heater shell or the heating chamber of an aerosol-generating device. Preferably, the securing tooth is rectangular shaped. The securing tooth may be configured to secure a heater shell within the support element when the heater shell is inserted into the support element. Preferably, the at least one securing tooth is provided on the outer surface of the support element. In one embodiment, at least one securing tooth is provided on the rim of a tubular, cylindrical, conical or frustoconical shaped support element. Preferably, the at least one securing tooth is easily bendable. In particular, the securing tooth may be designed to bend towards the outer wall of the support element when inserted into a heating chamber of an aerosol-generating device by frictional forces between the surface of the securing tooth and the surface of the inner wall of the heating chamber. The position of the support element relative to the heating chamber may be fixed and secured by the securing tooth. Preferably, the securing tooth is made from a polymeric material. Preferably, the support element may comprise more than two securing teeth. Most preferably, the support element may comprise three securing teeth. If more than one securing tooth is provided, the securing teeth may preferably be configured in a symmetric arrangement. Preferably, the arrangement is such that for n securing teeth, securing teeth are positioned at each vertex of an imaginary n-polygon on the support element. For example, if three securing teeth are present, the securing teeth may be positioned at each vertex of an imaginary triangle. The provision of the securing teeth on the heater shell and on the support element allows for fast and reliable insertion of heater shell into the support element. The provision of the securing teeth on the heater shell and on the support element allows for fast and reliable insertion of the support element into a heating chamber of an aerosol-generating device. Furthermore, the securing teeth improve centralization and immobilization of the heater shell inside the support element, and of the support element inside a heating chamber. The securing teeth of the support element may be aligned with the projections of the support element provided on the inner wall of the support element. In other words, the securing teeth of the support element may be positioned on outside positions on the outer wall of the support element, and the projections of the inner wall may be positioned at corresponding opposite positions on the inner wall. This arrangement may ease manufacturing. Additionally, this arrangement may help guiding assembly of the heater shell into the support element, since the teeth on the outside of the support element may be seen during assembly. Also, stability may be provided, when the heater assembly is assembled, since the teeth of the support element may be aligned with the projection on the inner wall of the support element, and these projections may contact projections provided on the outer wall of the heater shell. In this way, forces might be optimally transmitted.

The heater assembly comprises a heater shell as described above, a support element as described above and at least one heating element. The heating element is arranged to line the inner wall of the heater shell. The heater shell is arranged within the support element. Hereby the heating element may be arranged, such that an aerosol-generating article comprising an aerosol-forming substrate may be received into the heating element. In such an arrangement the heating element may be used as an external heater. The heating element may surround or at least partially surround an aerosol-generating article received in the heater assembly. The heating element may be configured to supply thermal energy to the aerosol-generating article. The heating element may preferably be a flexible heater. Such a flexible heater may be rolled up to align the inner wall of the heater shell when inserted into the heater shell. The heating element may an electrically powered heating element. The heating element may be a susceptor material. An induction coil may be arranged surrounding the heating element. The heating element may be one or more flexible heating foils on a dielectric substrate, such as polyimide. The flexible heating foils may be shaped to conform to the perimeter of the cavity. Alternatively, the heating element may take the form a flexible metallic grid or grids, a flexible printed circuit board, or a flexible carbon fibre heater. The heater may exemplarily be a heated coil, a heated capillary, a heated mesh or a heated metal plate. The heater may exemplarily be a resistive heater which receives electrical power and transforms at least part of the received electrical power into heat energy. The heater may comprise only a single heating element or a plurality of heating elements. The heating element may also be formed using a metal having a defined relationship between temperature and resistivity. In such an exemplary device, the metal may be formed as a track between two layers of suitable insulating materials. A heating element formed in this manner may be used to both heat and monitor the temperature of the heating element during operation. Standard commercially available flexible heaters such as Kapton heaters or polyimide heaters may be used. These Kapton heaters may available in a variety of shapes, sizes and wattage ratings. Alternatively, custom-made flexible heaters may be used. Such custom-made heaters may e.g. be polyimide supported heaters. Such flexible heaters may be very thin and light-weighted, minimising the weight and bulkiness of the aerosol-generating device. The heating element may be substantially flat.

The portion of the heating element, which may be in contact with an aerosol-generating article, may be heated as a result of electrical current passing through the heating element. The current may be supplied by a battery. In one embodiment, this portion of the heating element is configured to reach a temperature of between about 150° C. and about 350° C., preferably between about 170° C. and about 350° C., more preferably between about 200° C. and about 300° C. in use. Preferably, the heating element is configured to reach a temperature of between about 220° C. and about 280° C. The heating element may be configured to reach a temperature of about 250° C. The heating element may alternatively be configured to reach a lower temperature of about 170° C. The heating element when inserted into the heater shell is configured to receive an aerosol-generating article containing the aerosol forming substrate.

A heat reflective element may be provided between the heating element and the heater shell of the heater assembly. The reflective element is preferably a metal foil. The reflective element reduces heat loss from the heating element and the heater shell to the external environment. Reduced heat loss to the environment may also diminish undesired transfer of thermal energy onto a user using the electrically heated smoking system. The reflective element may be made from a material which reduces degradation at the high temperatures reached in the heater shell or by the heating element inserted into the heater shell when an aerosol-generating device, into which the heater shell and heating element may be integrated, is in operation. Preferably, the thermally insulating material comprises a metal or another non-combustible material. In one example, the metal is gold. In another example, the metal is silver. A metal may advantageous as it may reflect thermal radiation back into the electrically heated smoking system. Preferably, the reflective element surrounds the entire heating element. Preferably, the reflective element is thin, such that it is flexible enough to be wrapped around the heating element and to minimise the weight of the heater assembly and an aerosol-generating device in which it may be implemented. The shape of the reflective element may also define the shape of the heater shell. The reflective element may be tubular, cylindrical, conical or frustoconical.

The invention is also directed towards an aerosol-generating device comprising the heater assembly. The aerosol-generating device may comprise a mouthpiece. The aerosol-generating device may comprise a heating chamber. The heating chamber may be configured to receive the heater assembly. The heater assembly may comprise the heater shell, the support element and the heating element. The heater shell is configured to receive the heating element. The support element may be configured to receive the heater shell. The heater assembly may comprise the heat reflective element.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs through the user's mouth. An aerosol-generating device may be a holder. The device is preferably a portable or handheld device that is comfortable to hold between the fingers of a single hand. In other embodiments, the aerosol-generating device may be a shisha device.

The shisha device may include a vessel defining an interior volume configured to contain liquid and defining a headspace outlet above a fill level for the liquid. The liquid preferably comprises water. The shisha device may include a heater assembly as described above. The heater assembly may include a heater shell, an inserted heating element and a support element. The heater assembly may include a receptacle configured to receive an aerosol-generating article comprising an aerosol-forming substrate. The heating element of the heater assembly may be arranged surrounding the receptacle. In some embodiments, the aerosol-generating article may be provided in the form of a capsule or a cartridge. The heater assembly may include the heating element which may form at least one surface of the receptacle. The heater assembly may include a fresh air inlet channel that draws fresh air into the device. Air may enter the cartridge, which may be heated by the heating element, to carry aerosol generated by the aerosol-forming substrate. The air exits an outlet of the heater assembly and enters a conduit. The conduit may carry the air and aerosol into the vessel below the level of the liquid. The air and aerosol may bubble through the liquid and exit the headspace outlet of the vessel. A hose may be attached to the headspace outlet to carry the aerosol to the mouth of a user. A mouthpiece may be attached to, or form a part of, the hose. The mouthpiece may include an activation element. The activation element may be a switch, button or the like, or may be a puff sensor or the like. The activation element may be placed at any other suitable location of the shisha device. The activation element may be in wireless communication with the control electronics to place the shisha device in condition for use or to cause control electronics to activate the heating element.

An aerosol-generating device may have a heating chamber, in which the heater assembly comprising the heater shell, the support element and the heating element may be arranged. The heating element may heat an aerosol-forming substrate.

The aerosol-generating device may comprise further components such as a control element and a battery. The battery may be configured to supply electric power to the heating element for operating the heating element. The control element may be configured to control the flow of electrical energy from the battery towards the heating element.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The control element may be a simple switch. Alternatively the control element may be electric circuitry and may comprise one or more microprocessors or microcontrollers.

As used herein, the term 'aerosol-generating article' refers to an article comprising an aerosol-forming substrate that is capable of releasing volatile compounds that may form an aerosol. For example, an aerosol-generating article may be a smoking article that generates an aerosol that is directly inhalable into a user's lungs through the user's mouth. An aerosol-generating article may be disposable. A smoking article comprising an aerosol-forming substrate comprising tobacco may be referred to as a tobacco stick. In some embodiments, an example of an aerosol-generating article to be used with the heater shell of the present invention may be consumables having a frustoconical shape, having a large diameter of about 28 mm, a small diameter of about 22 mm and a height of about 41.5 mm. Such consumables may be provided in the form of a capsule. Such consumables may comprise a wrapper. The aerosol-generating article may be solid and in the form of a plug. The aerosol generating article may comprise molasses. The aerosol-generating article may comprise a shisha substrate. Another example of an aerosol-generating article to be used with the heater assembly of the present invention may be tobacco sticks. The aerosol-generating article may comprise a tobacco plug comprising an aerosol-forming substrate. The aerosol-forming substrate may be cut-filler. The aerosol-forming substrate may be impregnated with an aerosol former. The aerosol-generating article may further comprise a filter, preferably a hollow acetate tube, downstream of the substrate portion. Preferably, the length of the aerosol-generating article comprising the hollow acetate tube is between 30 mm and 60 mm, preferably between 40 mm and 50 mm, more preferably 45 mm. The article may have a diameter of between 5 mm and 6 mm, preferably about 5.3 or 5.4 mm. Alternatively, slim or super slim articles may be used with a diameter of between 2 mm and 4 mm, preferably 3.3 mm. As a further alternative, the article may have a diameter of between 6 mm and 10 mm.

As used herein, the term 'aerosol-forming substrate' relates to a substrate capable of releasing volatile compounds that may form an aerosol. Such volatile compounds may be released by heating the aerosol-forming substrate. An aerosol-forming substrate may conveniently be part of an aerosol-generating article or smoking article. The aerosol-forming substrate preferably comprises a tobacco-containing material containing volatile tobacco flavour compounds which are released from the aerosol-forming substrate upon heating. Alternatively, the aerosol-forming substrate may comprise a non-tobacco material. The aerosol-forming substrate is preferably a solid substrate.

The invention also relates to a method for manufacturing a heater assembly for an aerosol-generating device. The method may comprise the following steps:

(a) providing a heater shell, wherein the heater shell is configured for receiving a heating element and having an inner wall comprising a plurality of thermally insulating cavities.
(b) inserting into the heater shell at least one heating element lining the inner wall of the heater shell;
(c) inserting into a support element the heater shell comprising the heating element, wherein the support element is configured for receiving the heater shell.

An aerosol-generating article may be inserted into the heating element. The heating element may be used to transfer energy to the aerosol-forming substrate of the aerosol-generating article. Aerosol may be released as a result of the transfer of thermal energy from the heating element to the aerosol-forming substrate of the aerosol-generating article. The heater assembly may be used in an aerosol-generating device.

The invention will be further described, by way of example only, with reference to the accompanying drawings in which.

Figure 1:
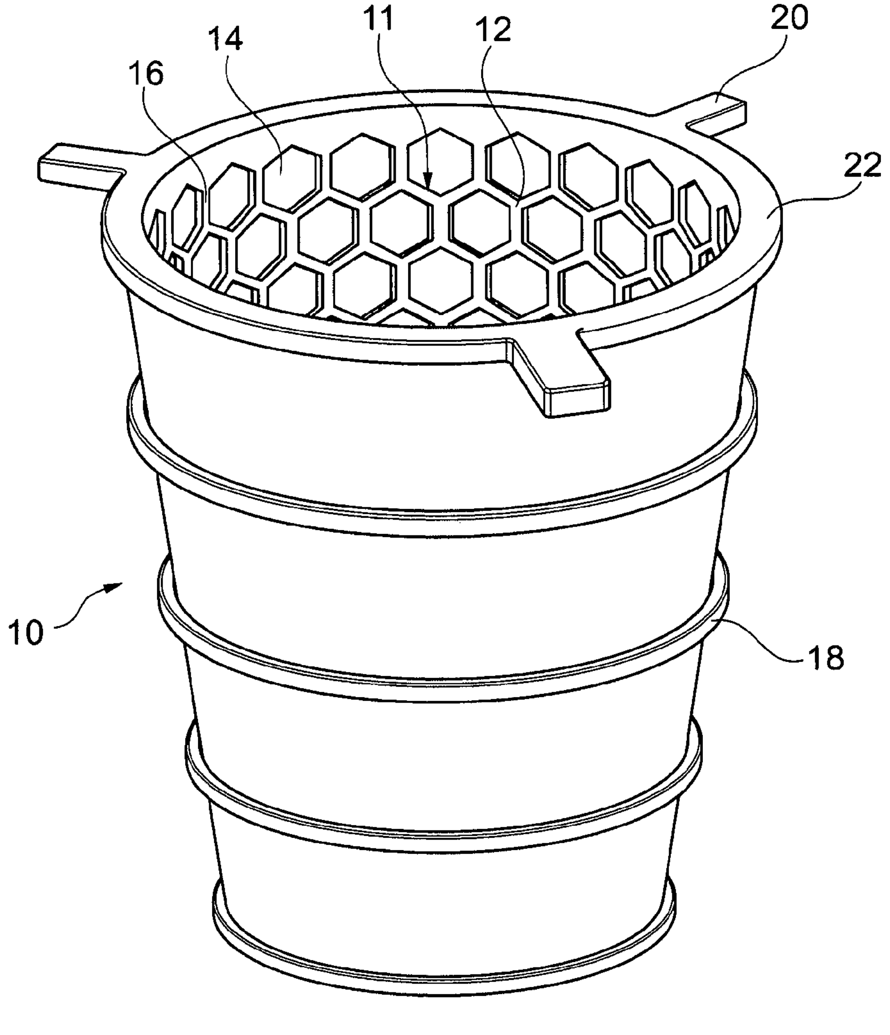
FIG. 1 shows a heater shell according to this invention.

FIG. 1 shows an embodiment of a tubular heater shell 10. The heater shell defines a cavity 11, defined by an inner wall 12 of the heater shell 10. The inner wall 12 of the heater shell 10 comprises a plurality of hexagonally shaped cavities 14. The hexagonally shaped cavities 14 are arranged in a honeycomb array. The hexagonal shape of the cavities 14 is at least partially defined by the shape of the protrusions 16 on the inner wall 12 of the heater shell 10. In the shown embodiment, the heater shell 10 comprises several ring shaped projections 18 on the outer wall of the heater shell 10. 4 ring shaped projections 18 are shown, in addition to a top rim 22. It will be understood that more of fewer ring shaped projections 18 may be provided. Three securing teeth 20 are provided on the rim 22 of the tubular heater shell 10. The securing teeth 20 may anchor the heater shell 10 inside a support element, such as support element 24 shown in FIG. 2, or may anchor the heater shell 10 inside a heating chamber of an aerosol-generating device.

At least one heating element (not shown) may be inserted into the cavity 11 of the heater shell 10, such that the heating element follows the inner wall 12. In the illustrated embodiment, the inner wall 12 translates about a circular cross section of varying diameter. The heating element in the illustrated embodiment may be inserted into the cavity 11 of the heater shell 10 such that the heating element follows a circumference of the cavity 11 of the tubular heater shell 10. The heating element may be in contact with the inner wall of the heater shell 10. The heating element may be flush with the inner wall of the heater shell 10. The heating element may be adjacent to the heater shell 10, but not be in contact with the inner wall of the heater shell 10. The heating element may follow the surface of the inner wall of the heater shell 10. When the heating element is inserted in the cavity 11 of the heater shell 10, the heating element contributes to the definition of a cavity. An aerosol-generating article comprising an aerosol-forming substrate may be inserted into the cavity at least partially defined by the heating element received in the heater shell 10. The heating element may completely or partially surround the aerosol-generating article. The heating element may be connected to a power supply. The heating element may be a susceptor material. The heating element may be an electrically powered heating element. The heating element may be configured to heat inductively. The heating element may supply energy to the aerosol-generating article when the aerosol-generating article is received in the cavity at least partially defined by the heating element. Preferably, the shape of the heater shell 10 mirrors or complements the shape of the aerosol-generating article in order to provided close contact between the aerosol generating article and the heating element inside the heater shell 10. In this way, the efficiency of energy transfer from the heating element to the aerosol-generating article and aerosol-forming substrate may be maximised.

Figure 2:
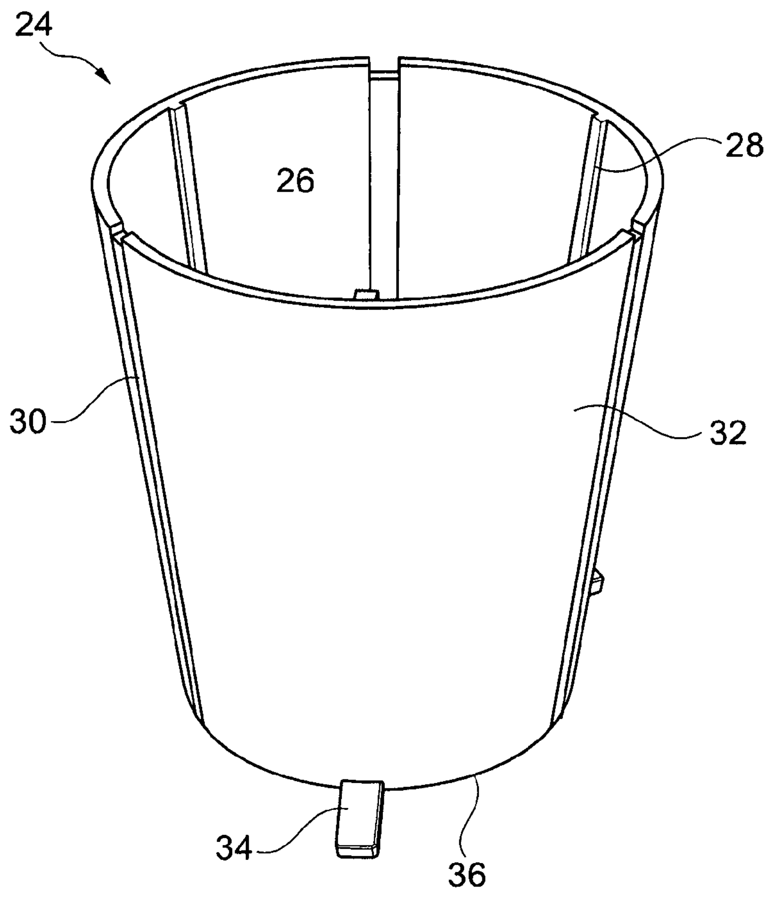
FIG. 2 shows a support element according to this invention.

FIG. 2 shows an embodiment of a tubular support element 24 comprising an inner wall 26. The inner wall 26 of the support element 24 comprises several linear projections 28. The longitudinal axes of the linear projections 28 are aligned parallel to the inner wall 26 of the tubular support element 24. The support element 24 furthermore comprises linear projections 30 on an outer wall 32 of the support element 24. The projections 30 on the outer wall 32 are arranged such that the longitudinal axes of the linear projections 30 are parallel to the outer wall 32 of the tubular support element 24. The support element also comprises a lower rim 36.

A heater shell, such as the one shown in FIG. 1, which may comprise a heating element, may be inserted into support element 24. The heater shell 10 may be inserted into the support element 24 such that a layer of air is formed between the inner wall 26 of the support element 24 and the outer wall of the heater shell 10. The ring-shaped projections 18 on the outer wall of the heater shell 10 and the linear projections 28 on the inner wall of the support element 24 are in direct contact. In this way cells, which may be filled with air, are formed between the support element 24 and the heater shell 10. The projections 18 on the outer wall of heater shell 10 and the projections 28 on the inner wall of support element 24 are designed, such that contact area between the projections 18 on the outer wall of heater shell 10 and the projections 28 on the inner wall of support element 24 is minimized, reducing heat loss by heat conduction though the contact area. The dimensions of the projections 28 of the support element and the projections 18 on the outer wall of the heater shell 10 substantially determine the thickness of the layer of air in the cells between the support element 24 and the heater shell 10. The layer of air represents a thermally insulating layer between the support element 24 and the heater shell 10. In this way, convective heat loss from the heater shell to the support element and its external environment is minimised as air circulation in within the cell between the heater shell 10 and the support element 24 is diminished. To reduce heat loss even further, a heat reflective element (not shown) may be inserted between the heater shell 10 and the support element 24. Such a heat reflective element may be a thin metal sheet. The presence of the heat reflective element directs thermal radiation incident on the heat reflective element towards a central space in the cavity 11 of heater shell 10.

The support element 24 comprises a set of securing teeth 34 on the rim 36 of the tubular support element 24. In some embodiments, the securing teeth 34 may anchor the support element 24 within a heating chamber of an aerosol-generating device into which the support element may be inserted. In some embodiments, the securing teeth 34 may anchor the support element 24 to the heater shell 10. For example, the securing teeth 34 could be bent relative to the heater shell 10, into the cavity 11 by urging the teeth 34 against the inner wall 12 of the heater shell 10 when the heater shell 10 is received within the support element 24. In some embodiments, one or more of the securing teeth 34 may anchor the support element 24 within a heating chamber of an aerosol-generating device into which the support element 24 may be inserted, whilst the other of the securing teeth 34 may anchor the support element 24 relative to the heater shell 10.

The support element 24 may be integrated into a heating chamber of an aerosol-generating device. The support element may at least partially define the shape and size of the heating chamber. The projections 30 on the outer wall of the support element 24 may be in intimate contact with inner walls of the heating chamber when the support element 24 is received into the heating chamber. Frictional forces between the surface of the projections 30 on the outer wall of the support element 24 and the surface of the inner wall of the heating chamber may firmly hold and retain the support element 24 within the heating chamber. Furthermore, a set of cells, which may comprise air, may form between the inner wall of the heating chamber and the outer wall of the support element 24, thereby forming a thermally insulating layer between the heating chamber and the support element 24 when the support element 24 is placed inside the heating chamber. Such thermally-insulating layer may minimise heat loss from the support element to the walls of the heating chamber.

Figure 3:
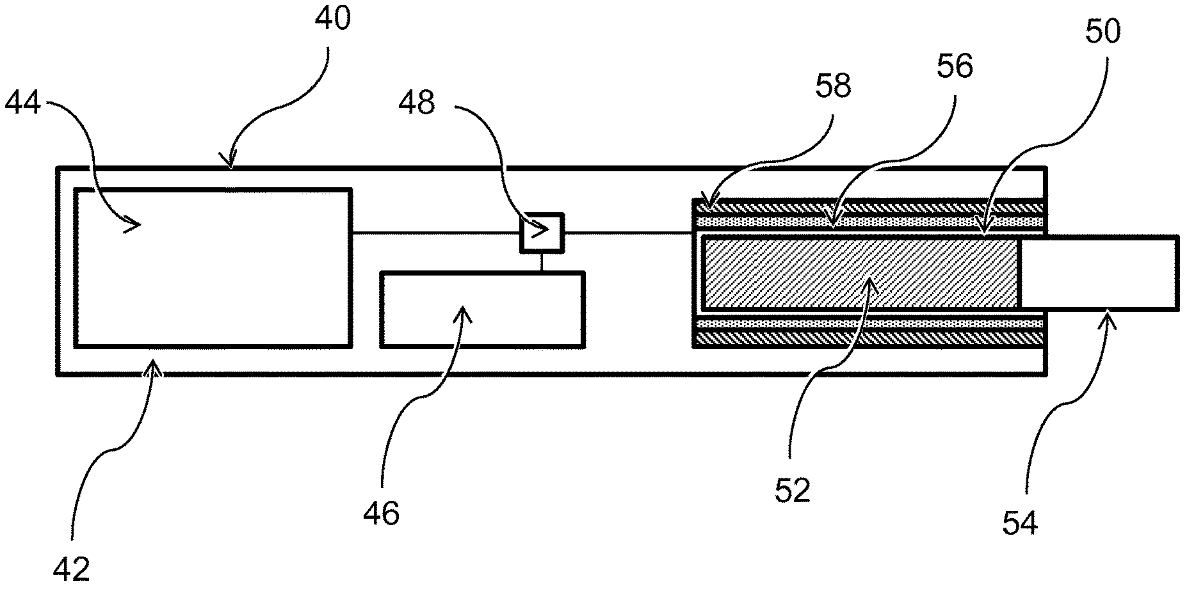
FIG. 3 shows an exemplary aerosol-generating device according to this invention.

FIG. 3 shows a schematic sectional view of an example of an aerosol-generating device 40 according to the invention. The aerosol-generating device comprises a device housing 42. The device housing 42 comprises a power supply 44 and a controller 46. The power supply 44 and the controller 46 are coupled to a user interface 48. The user interface 48 is coupled to a heating element 50. The heating element 50 at least partially surrounds the aerosol-forming substrate 52 of an aerosol-generating article 54. The aerosol-generating article 54 comprising the aerosol-forming substrate 52 is configured to be inserted into the heating element 50. The heating element 50 may be inserted into a heater shell 56. The heater shell 56 may be inserted into a support element 58. The aerosol-generating device may comprise a mouthpiece. The mouthpiece may be arranged downstream of the aerosol-generating article 54. The aerosol-generating article 54 may be at least partially surrounded by the mouthpiece and the other components of the aerosol-generating device. A user may draw on the mouthpiece.

Figure 4:
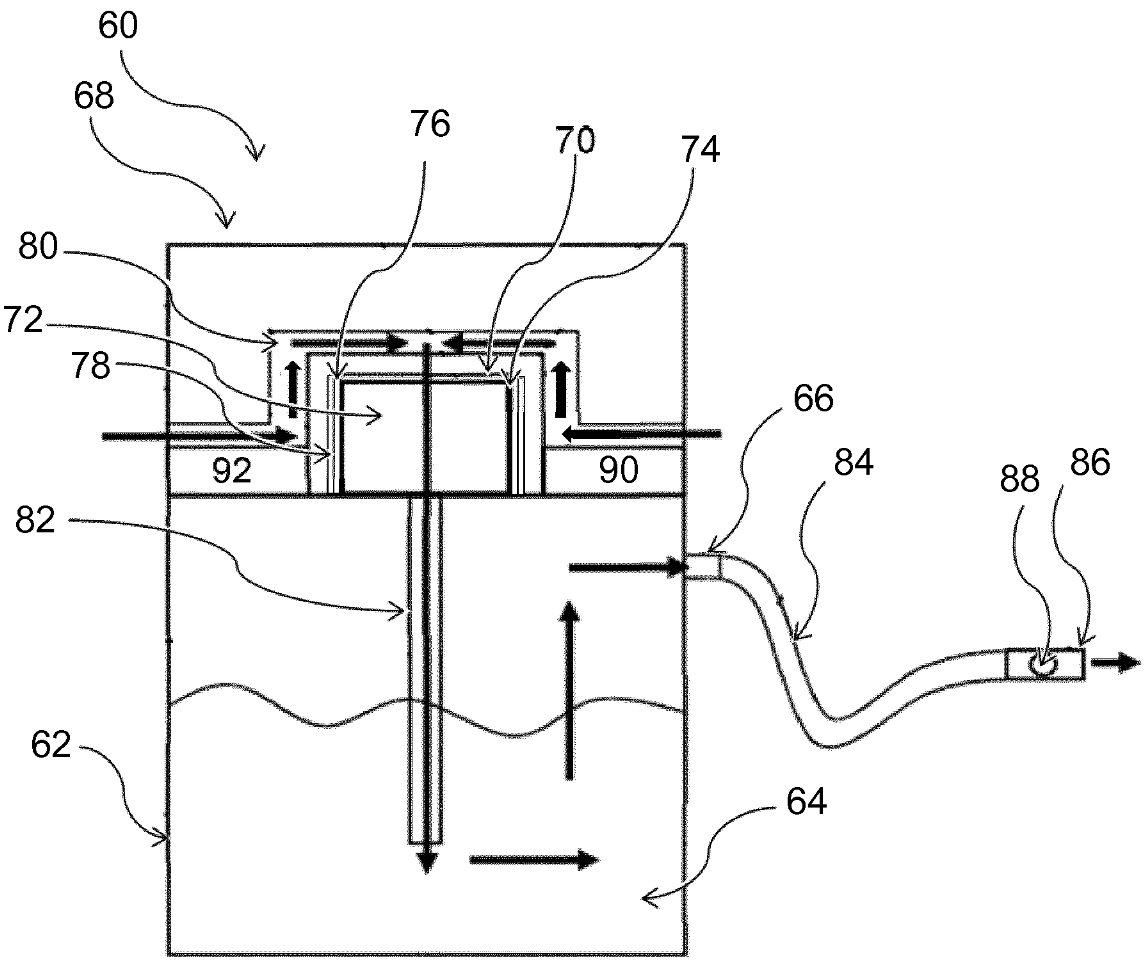
FIG. 4 shows an exemplary aerosol-generating device according to this invention provided as a shisha device.

FIG. 4 shows a schematic sectional view of an example of an aerosol-generating device 60 according to the invention. The aerosol-generating device 60 may be a shisha device. The device 60 includes a vessel 62 defining an interior volume configured to contain liquid 64 and defining a headspace outlet 66 above a fill level for the liquid 62. The liquid 62 preferably comprises water, which may optionally be infused with one or more colorants, one or more flavorants, or one or more colorants and one or more flavorants. For example, the water may be infused with one or both of botanical infusions or herbal infusions.

The device 60 also includes a heater assembly 68. The heater assembly 68 includes a receptacle 70 configured to receive an aerosol-generating article 72 comprising an aerosol-forming substrate. In some embodiments, for example, as shown in FIG. 4, the aerosol-generating article 72 may be provided in the form of a capsule or a cartridge.

The heater assembly 68 also includes a heating element 74 which forms at least one surface of the receptacle 70. In the depicted embodiment, the heating element 74 defines the side surfaces of the receptacle 70. The heating element 74 may be inserted into a heater shell 76. The heater shell may be inserted into a support element 78.

The heater assembly 68 also includes a fresh air inlet channel 80 that draws fresh air into the device 60. The air then enters the aerosol-generating article 72, which is heated by heating element 74, to carry aerosol generated by the aerosol-forming substrate. The air exits an outlet of the heater assembly 68 and enters a conduit 82. The conduit 82 may also be denoted as stem pipe.

The conduit 82 carries the air and aerosol into the vessel 62 below the level of the liquid 64. The air and aerosol may bubble through the liquid 64 and exit the headspace outlet 66 of the vessel 64 A hose 84 may be attached to the headspace outlet 66 to carry the aerosol to the mouth of a user. A mouthpiece 86 may be attached to, or form a part of, the hose 84.

An exemplary air flow path of the device, in use, is depicted by thick arrows in FIG. 4. The mouthpiece 86 may include an activation element 88. The activation element 88 may be a switch, button or the like, or may be a puff sensor or the like. The activation element 88 may be placed at any other suitable location of the device 60. The activation element 88 may be in wireless communication with the control electronics 90 to place the device 60 in condition for use or to cause control electronics to activate the heating element 74; for example, by causing power supply 92 to energize the heating element 74.

The control electronics 90 and power supply 92 may be located in any suitable position of the aerosol generating element 68 other than the bottom portion of the element 68 as depicted in FIG. 4.

The invention claimed is:

1. An aerosol-generating device comprising a heating chamber and a heater assembly, wherein the heating chamber is configured to receive the heater assembly, wherein the heater assembly comprises a heater shell, a support element and at least one heating element, the heater shell being configured for receiving the heating element, the heater shell having an inner wall comprising a plurality of thermally insulating cavities, wherein the heating element is arranged lining the inner wall of the heater shell, and wherein the heater shell is arranged within the support element.

2. The aerosol-generating device of claim 1, wherein the cavities form a repeating pattern on the inner wall of the heater shell.

3. The aerosol-generating device of claim 1, wherein each cavity has a hexagonal shape, preferably such that the plurality of cavities forms a honeycomb pattern.

4. The aerosol-generating device of claim 1, wherein each cavity has a rectangular shape, preferably such that the plurality of cavities forms a grid pattern.

5. The aerosol-generating device of claim 1, wherein the heater shell has a tubular, cylindrical, conical or frustoconical shape.

6. The aerosol-generating device of claim 1, wherein the heater shell comprises at least one projection on an outer wall of the heater shell, preferably, wherein the at least one projection has a ring shape.

7. The aerosol-generating device of claim 1, wherein the heater shell comprises at least one securing tooth.

8. The aerosol-generating device of claim 1, wherein the support element is configured for receiving the heater shell.

9. The aerosol-generating device of claim 1, wherein the support element has an inner wall, wherein the support element comprises at least one projection on the inner wall of the support element such that at least one thermally insulating cell is formed between the support element and the heater shell, when the heater shell is inserted into the support element, and wherein the at least one projection on the inner wall of the support element preferably has a linear shape.

10. The aerosol-generating device of claim 1, wherein the support element has an outer wall, wherein the support element comprises at least one projection on the outer wall of the support element, wherein the at least one projection preferably has a linear shape.

11. The aerosol-generating device of claim 1, wherein the support element has a tubular, cylindrical, conical or frustoconical shape.

12. The aerosol-generating device of claim 1, wherein the support element has at least one securing tooth.

13. The aerosol-generating device of claim 1, wherein a heat reflective element is provided between the heating element and the heater shell, wherein the heat reflective element is preferably a metal foil.

14. A method for manufacturing a heater assembly for insertion into a heating chamber of an aerosol-generating device, wherein the method comprises the following steps:

(a) providing a heater shell, wherein the heater shell is configured for receiving a heating element and having an inner wall comprising a plurality of thermally insulating cavities;

(b) inserting into the heater shell at least one heating element lining the inner wall of the heater shell;

(c) inserting into a support element the heater shell comprising the heating element, wherein the support element is configured for receiving the heater shell.

* * * * *